United States Patent [19]

Mandish et al.

[11] 4,011,355
[45] Mar. 8, 1977

[54] EMULSION COATING FOR LIGHTWEIGHT AGGREGATE

[76] Inventors: Theodore O. Mandish; Doneath M. Mandish, both of Rte. No. 2, Box 184, Titusville, Fla. 32780

[22] Filed: Apr. 28, 1975

[21] Appl. No.: 572,153

Related U.S. Application Data

[63] Continuation-in-part of Ser. No. 488,318, July 15, 1974, abandoned.

[52] U.S. Cl. .................. 427/214; 106/90; 106/104; 106/118; 260/2.5 R; 260/2.5 B; 260/42.13; 427/222; 428/403; 428/404; 428/407

[51] Int. Cl.$^2$ ............... B05D 7/02; B32B 13/02; B32B 5/18

[58] Field of Search ............... 428/403, 404, 407; 260/2.5 R, 42.13, 2.5 B; 106/90, 104, 118; 427/214, 222

[56] References Cited

UNITED STATES PATENTS

| | | | |
|---|---|---|---|
| 3,021,291 | 2/1962 | Thiessen | 106/90 |
| 3,066,031 | 11/1962 | Schifferle | 106/118 |
| 3,076,717 | 2/1963 | Minnick | 106/118 |
| 3,104,196 | 9/1963 | Shannon | 428/407 |
| 3,214,393 | 10/1965 | Sefton | 260/17.4 R |
| 3,257,338 | 6/1966 | Sefton | 260/42.13 |
| 3,291,762 | 12/1966 | Raymond | 260/23 S |
| 3,498,809 | 3/1970 | Andersson | 106/118 |
| 3,669,701 | 6/1972 | Biederman | 106/85 |
| 3,679,445 | 7/1972 | Howe | 106/90 |

FOREIGN PATENTS OR APPLICATIONS 836,499   6/1960   United Kingdom

*Primary Examiner*—George F. Lesmes
*Assistant Examiner*—Ellis P. Robinson
*Attorney, Agent, or Firm*—Duckworth, Hobby, Orman, Allen, & Pettis

[57] ABSTRACT

A coated, lightweight aggregate for mixing with cement, sand and water for producing a lightweight construction material is provided in which expanded polystyrene beads are coated with a mixture formed of dehydrated lime and hydrated alumina with water in an amount to impart a suitable consistency and a wetting agent. A method of making the mixture and coating the beads is also provided.

2 Claims, No Drawings

EMULSION COATING FOR LIGHTWEIGHT AGGREGATE

This is a continuation-in-part of patent application Ser. No. 488,318, filed July 15, 1974 for Donolite Emulsion, now abandoned.

BACKGROUND OF THE INVENTION

The present invention relates to lightweight aggregates and in particular to a lightweight expanded polymer used as an aggregate when coated with a mixture formed with dehydrated lime and hydrated alumina and to a method of coating an expanded polymer with the specific mixture preparatory to mixing with cement, sand and water for producing a lightweight construction material.

In the past, concrete blocks and other materials have been manufactured by mixing predetermined mixes of Portland cement, sand and water and adding various types of aggregates made from a great variety of materials, such as rock granite and slag from smelting operations. Lightweight aggregates may be produced from slags from the production of phosphoric acid, and the like. Lightweight aggregates have the advantage of producing a lighter building block or material having great strength in compression and with reduced problems of shipping and handling due to the lighter weight and while advantageously providing additional isulation value. The prior art also suggests using a variety of products, as aggregates, as well as various compositions for mixing with aggregates which include the use of polystyrene with a homogenizing agent as set forth in U.S. Pat. No. 3,257,338 for a concrete composition comprising cement, a primary aggregate, expanded polystyrene and a homogenizing agent, the homogenizing agent being an alkali metal salt. The use of a foamed thermoplastic polymer for plastering masonry surfaces is taught in U.S. Pat. No. 3,291,762 and uses flakes of a foamed thermoplastic polymer with up to 97% by weight of a dry filler and minor proportions of drying oil in a solvent. U.S. Pat. No. 3,066,031 teaches a cementous material and method of preparing such material using calcium oxide mixed with a reactant of silicon dioxide and aluminum dioxides while U.S. Pat. No. 3,669,701 teaches a lightweight cement for oil wells which utilizes small cenospheres consisting primarily of silica-alumina. Other compositions may be seen in U.S. Pat. No. 3,076,717 for building load supporting surfaces; U.S. Pat. No. 2,060,295 for an acoustical or insulating plaster; and in U.S. Pat. No. 3,021,291 for preparation of concrete containing expanding polymeric particles in which a concrete mixture of Portland cement is mixed with polymeric material in the form of small particles, including the polymers of styrene and ethylene. U.S. Pat. No. 3,272,765 teaches a lightweight concrete having a lightweight aggregate of closed celled multicellular expanded polymeric particles and a binder containing entrained air. U.S. Pat. No. 3,214,393 teaches a concrete mixture containing expanded polystyrene and homogenizing agent in which cement, a primary aggregate, expanded sytrene polymer and homogenizing agent consisting of polyvinyl alcohol and a bituminous compound and the alkali metal salt of the aliphatic insoluble portion of the aromatic extract of pinewood are combined. U.S. Pat. No. 2,517,993 teaches a hydraulic cement composition of Portland cement, burned slag and other materials while U.S. Pat. No. 3,679,445 teaches a low density concrete having Portland cement and high alumina cement along with a fine aggregate and a course aggregate and short fibers and air entrained therein. U.S. Pat. No. 3,498,809 teaches a finishing mortar composed of a filler binder in water and utilizing an inorganic gel which is a reaction product of an inorganic base and a metal salt along with a water soluble cellulose derivative. United Kingdom Pat. specification No. 836,499 teaches improvements to lightweight concrete and aggregates in which a nonbrittle cellular springy particle of porous material are dispersed substantially uniform through a construction material.

In contrast to the prior patents, the present invention teaches a mixture used to coat expanded polystyrene beads, or the like, which have obtained high thermal resistant qualities and compressive strengths. The present coating of expanded polystyrene beads improves the quality and physical characteristics of a concrete product using expanded polystyrene beads as an aggregate.

SUMMARY OF THE INVENTION

The present invention relates to lightweight aggregates and in particular to a coated, expanded polymer bead such as expanded polystyrene beads which are used as a lightweight aggregate in concrete products and are coated with a mixture formed of dehydrated lime and hydrated alumina with water in an amount to impart a suitable consistency and a wetting agent. Cement can also be added to the bead coating during the mixing of the mixture with the beads, as well as fiberglass to impart additional strength to the final product. The coated beads are mixed with cement, sand and water and cured for producing a lightweight construction material. A method is also described in which a lightweight coated aggregate is prepared by forming a mixture of dehydrated lime and hydrated alumina with water having a wetting agent therein to form a suitable consistency with the dehydrated lime and hydrated alumina and then coating lightweight, expanded polymer beads with said mixture while mixing a predetermined amount of cement with the coated, expanded beads and adding fiberglass to the mixture if desired. The coated beads may then be combined with additional cement, sand and water which upon curing will form a lightweight, concrete material which may also be formed with a coating on one side which may be colored and textured as desired.

DESCRIPTION OF THE PREFERRED EMBODIMENTS

A mixture is prepared in a dry form using approximately equal parts by volume of dehydrated lime and hydrated alumina, such as approximately 50 parts of dehydrated lime together with approximately 50 parts of hydrated alumina, which mixture is thoroughly mixed prior to the adding of water having a wetting agent of approximately one-quarter of 1% to bring the consistency of the material to where it is suitable for coating polystyrene beads. Expanded polystyrene beads are introduced into a paddle type mixer to which glass fibers may be added on the order of 1 pound per six cubic feet of expanded beads which are mixed dry until thoroughly distributed. The mixture formed from the dehydrated lime, hydrated alumina, water and wetting agent which has been mixed in a blender to form a mixture is added at a rate of approximately 2 quarts to six cubic feet of expanded polystyrene beads. The mixture in the beads having the fiberglass therein, if desired, may have approximately 2 quarts of dry cement sprinkled into the mixer for mixing therewith until the expanded polystyrene beads are completed coated with the mixture and cement and any fiberglass therein. The mixer is turned to a higher speed to complete the coating. Once the beads are coated, they are taken from the mixer and placed into storage containers for introduction into a cement mixture of Portland cement, or the like, and sand and water as desired. This concrete mixture is then available for use with many applications from small, precast concrete items to large precast concrete panels for roofing and wall panels and can be used for precasting sanitary wares and furniture, as well as insulation in solar heaters, therapeutic whirl pool baths and in the manufacture of hydroponic systems. The invention will be further illustrated by the following examples wherein, unless otherwise designated, parts are by volume.

EXAMPLE ONE

The mixture is prepared by adding 50 parts dehydrated lime and 50 parts hydrated alumina with sufficient water having a wetting agent therein to form a suitable consistency. This forms a mixture when thoroughly mixed in a high speed blender and 2 quarts of this mixture are added to 6 cubic feet of expanded polystyrene beads and 2 quarts of dry cement are sprinkled over each 6 cubic feet of polystyrene beads and 2 quarts of mixture to coat the polystyrene beads. The coated beads are then ready for the addition as a lightweight aggregate to a Portland cement mixture.

EXAMPLE TWO

A method of making a lightweight, coated aggregate has the steps of forming a mixture of 50 parts dehydrated lime and 50 parts of hydrated alumina with water having one-quarter of 1% wetting agent therein to form a suitable consistency and mixing in a high speed blender to form a mixture. Two quarts of the mixture are added in a mixer to 6 cubic feet of expanded polystyrene beads and mixed until the expanded polystyrene beads are fully coated with the mixture. Two quarts of Portland cement are added during the mixing which continues until all beads are fully coated. The coated, expanded polystyrene beads are then added to a mixture of Portland cement, sand and water and cured to form a lightweight concrete material.

EXAMPLE THREE

The ratio of the required mixture to the amount of beads can be reduced when the beads have been recently expanded and have moisture from steam coating the beads. The following table indicates proportions by volume and weight for the coating and cement mix.

| COATING | | |
|---|---|---|
| Volume | | Weight |
| Beads | 6 cu. ft. | 6 lbs. |
| Mixture | 1 qt. | 1¼ lbs. |
| Water | 1 qt. | 2¼ lbs. |
| Cement | 2 qts. | 5 lbs. |
| Glass | 1 qt. | 1 lb. |
| Wetting Agent | ½ oz. | ½ oz. |
| CEMENT MIX | | |
| Volume | | Weight |
| Beads | 77 qts. | 19½ lbs. |
| Sand | 6 qts. | 17¾ lbs. |
| Cement | 22 qts. | 60½ lbs. |
| Wetting Agent | ½ pt. | ¾ lb. |

The foregoing has presented a novel coating and method of coating expanded, polystyrene beads but it should, of course, be clear that other expanded polymers can be utilized with the coating in the present invention and that the term "beads" is meant to include a variety of small particles, such as flakes or spheres, or the like. It should also be clear that the resulting curing of a concrete product with the coating provides a lightweight, concrete composition whose characteristics provide an improved thermal characteristic, as well as lightweight in class A and class B blocks and other materials, but whose characteristics may be widely varied depending upon the amount of coating on the expanded polymer and on the type of concrete and expanded polymer used in the composition. The coated beads allow a better bond with the cement mixtures and prevent the beads from floating to the top of the cement mixture and prevents the buildup of static electricity. It should also be clear that various other properties can be changed, such as the color of the product by the addition of pigments to the cement and by providing a coated gel surface or the like to the product being produced. Accordingly, the present invention is not limited to the particular forms disclosed herein which are to be considered illustrative rather than restrictive.

We claim:

1. A method of making a lightweight, coated aggregate for use in forming a lightweight concrete material, comprising the steps of:
    a. forming a mixture of approximately equal parts by volume of dehydrated lime and hydrated alumina in combination with water having a wetting agent therein to form a suitable consistency when thoroughly mixed in a mixer;
    b. coating lightweight expanded polymer beads with said mixture; and
    c. mixing cement with said coated expanded beads; said aqueous mixture of dehydrated lime and hydrated alumina, polymer beads and cement being employed in a ratio such that approximately 1 to 2 quarts of said aqueous mixture of dehydrated lime and hydrated alumina are employed for each approximately 6 cubic feet of polymer beads and approximately 2 quarts of cement.

2. The method in accordance with claim 1 including the step of mixing glass fibers with said lightweight, expanded polymer beads and said mixture of dehydrated lime and hydrated alumina.

* * * * *